United States Patent
Karandikar et al.

(10) Patent No.: US 10,433,234 B2
(45) Date of Patent: Oct. 1, 2019

(54) SDN CONTROLLED OVERLAY NETWORK

(71) Applicant: Indian Institute of Technology Bombay, Mumbai (IN)

(72) Inventors: Abhay Karandikar, Mumbai (IN); Pranav Kumar Jha, Gurgaon (IN); Akshatha Nayak M, Bangalore (IN); Pon Nidhya Elango, Chennai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 0 days.

(21) Appl. No.: 15/926,796

(22) Filed: Mar. 20, 2018

(65) Prior Publication Data

US 2018/0213465 A1    Jul. 26, 2018

(30) Foreign Application Priority Data

Feb. 2, 2018    (IN) .............................. 201821004104

(51) Int. Cl.
| | |
|---|---|
| *H04W 40/22* | (2009.01) |
| *H04W 12/06* | (2009.01) |
| *H04W 76/14* | (2018.01) |
| *H04L 12/715* | (2013.01) |
| *H04W 88/04* | (2009.01) |
| *H04W 88/06* | (2009.01) |
| *H04W 28/08* | (2009.01) |
| *H04W 12/00* | (2009.01) |
| *H04W 8/22* | (2009.01) |
| *H04W 84/12* | (2009.01) |
| *H04W 88/18* | (2009.01) |

(52) U.S. Cl.
CPC ............ *H04W 40/22* (2013.01); *H04W 12/06* (2013.01); *H04W 76/14* (2018.02); *H04L 45/64* (2013.01); *H04W 8/22* (2013.01); *H04W 12/00514* (2019.01); *H04W 28/08* (2013.01); *H04W 84/12* (2013.01); *H04W 88/04* (2013.01); *H04W 88/06* (2013.01); *H04W 88/18* (2013.01)

(58) Field of Classification Search
None
See application file for complete search history.

(56) References Cited

U.S. PATENT DOCUMENTS

| | | | |
|---|---|---|---|
| 2008/0307519 A1* | 12/2008 | Curcio | H04L 63/0227 726/15 |
| 2015/0171953 A1* | 6/2015 | Djukic | H04B 7/15507 370/252 |
| 2015/0188837 A1* | 7/2015 | Djukic | H04L 47/782 709/226 |
| 2016/0165648 A1* | 6/2016 | Kawashima | H04W 40/22 455/450 |

(Continued)

*Primary Examiner* — Kodzovi Acolatse
(74) *Attorney, Agent, or Firm* — Mannava & Kang, P.C.; Vinay Malik

(57) ABSTRACT

A SDN controlled Overlay Network. Embodiments disclosed herein relate to multi-RAT (Radio Access Technology) wireless communication network and more particularly to a SDN (Software Defined Networking) controlled network overlaid on a multi-RAT wireless communication network. Embodiments herein enhance relay functionality in wireless communication networks using overlay networks, wherein the overlay network is controlled and managed by a SDN (Software Defined Networking) controller.

12 Claims, 6 Drawing Sheets

(56) References Cited

U.S. PATENT DOCUMENTS

| | | | |
|---|---|---|---|
| 2017/0034122 A1* | 2/2017 | Hoffmann | H04L 12/4641 |
| 2017/0142028 A1* | 5/2017 | Huang | H04L 45/64 |
| 2017/0142653 A1* | 5/2017 | Qi | H04B 7/2606 |
| 2018/0035306 A1* | 2/2018 | Zavesky | H04W 16/18 |
| 2018/0212925 A1  | 7/2018 | Huang | H04L 61/2589 |
| 2018/0351652 A1* | 12/2018 | Ashrafi | H04B 10/616 |

* cited by examiner

SDN CONTROLLED OVERLAY NETWORK

CROSS REFERENCE TO RELATED APPLICATIONS

This applications claims priority from, IN Application Number 201821004104, filed on Feb. 2, 2018, the disclosure of which is incorporated by reference herein.

TECHNICAL FIELD

Embodiments disclosed herein relate to multi-RAT (Radio Access Technology) based wireless communication network and more particularly to a SDN (Software Defined Networking) controlled network overlaid on a multi-RAT based wireless communication network, wherein a cellular network is the primary network and at least one RAT based wireless communication network can be a supplementary network.

BACKGROUND

In certain situations, communication between mobile devices and wireless cellular networks may get hindered due to inadequate wireless coverage. This may happen due to natural or man-made obstructions. For example, in-building mobile devices may find it difficult to exchange radio signals with externally located base stations. This can happen due to poor propagation characteristics of radio signals inside concrete buildings.

Direct/Adhoc communication between mobile devices (Device-to-Device (D2D) mode) along with support for wireless Relays is a viable option for data transfer in such scenarios. Devices, which are unable to reach the cellular infrastructure directly, can use D2D mode to exchange data with other devices. Such data can be forwarded further with the help of relay nodes. Unfortunately, most of the currently deployed cellular wireless systems, e.g., GSM, 3G-UMTS or Release 8/9 of 3GPP LTE, support neither the relay functionality nor direct mode communication. Even though the recent standards of LTE technology have incorporated these features, these are yet to be deployed due to their implementation complexity, for example, a Relay node as envisaged in 3GPP LTE standards, is required to support the LTE eNodeB as well as a subset of User Equipment (UE) functionality thereby making it a fairly complex network element. While the LTE D2D solution, in addition to being technically complex, has some limitations such as supporting only single hop relay communication, using a distributed scheme for selection of the relay, and so on, which may not lead to an optimal path for data transfer through the network.

Adhoc/direct mode communication between UEs (User Equipments) can also be achieved by augmenting 3GPP-LTE based UEs with a supplementary Radio communication interface using a suitable wireless technology, such as a Wireless Local Area Network (for example, IEEE 802.11 Wi-Fi), or a Personal Area Network (for example, Bluetooth). Such hybrid networks, using LTE for infrastructure mode communication and a supplementary radio technology for adhoc/direct mode communication between UEs can be used to enhance the coverage of the wireless networks. In such a network, some of the UEs with connectivity to LTE eNodeB and having a supplementary radio interface can act as Relay Nodes between the two networks, i.e., between the LTE network and the adhoc networks. However the solution may not be optimal as the devices communicating in adhoc mode, i.e., without centralized control, may generate substantial interference for each other leading to poor performance of the network overall. This may be an issue in scenarios where multiple groups of users are contending for communication resources simultaneously in a geographical area. Devices in adhoc networks may also face problems related to energy consumption. Due to lack of centralized control, devices with low energy reserve (battery levels) also may participate in receiving/sending data on behalf of others leading to further drainage of battery for such devices. Additionally, direct communication between mobile devices over a supplementary radio link may not be secure, which renders this method almost unusable for use cases such as public safety/mission critical communication, where secure communication between mobile devices may be a critical requirement.

OBJECTS

The principal object of embodiments herein is to enhance relay functionality in wireless communication networks using overlay networks, wherein the overlay network is controlled and managed by a SDN (Software Defined Networking) controller.

Another object of embodiments herein is to disclose a SDN controller to control and manage overlay networks in a wireless communication network, where the SDN controller is configured to manage the designation of relays and association of relay nodes with UEs to extend the coverage area.

Another object of embodiments herein is to disclose a SDN controller to control and manage overlay networks in a wireless communication network, where the SDN controller is configured to authenticate the devices in the overlay network (such as UEs (User Equipments), relays, and so on) and enabling secure communication between the devices over a supplementary radio link.

Another object of embodiments herein is to disclose a SDN controller to control and manage overlay networks in a wireless communication network, where the SDN controller is configured to select an optimal path for data transfer between the devices in the overlay network.

Another object of embodiments herein is to disclose a SDN controller to control and manage overlay networks in a wireless communication network, where the SDN controller is configured to select an optimal path for data transfer between the devices in the overlay network, such that unnecessary battery drainage for devices with low energy reserves can be avoided.

Another object of embodiments herein is to disclose a SDN controller to control and manage overlay networks in a wireless communication network, where the SDN controller is configured to reduce interference in the supplementary radio network and thereby increase the throughput of the network.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
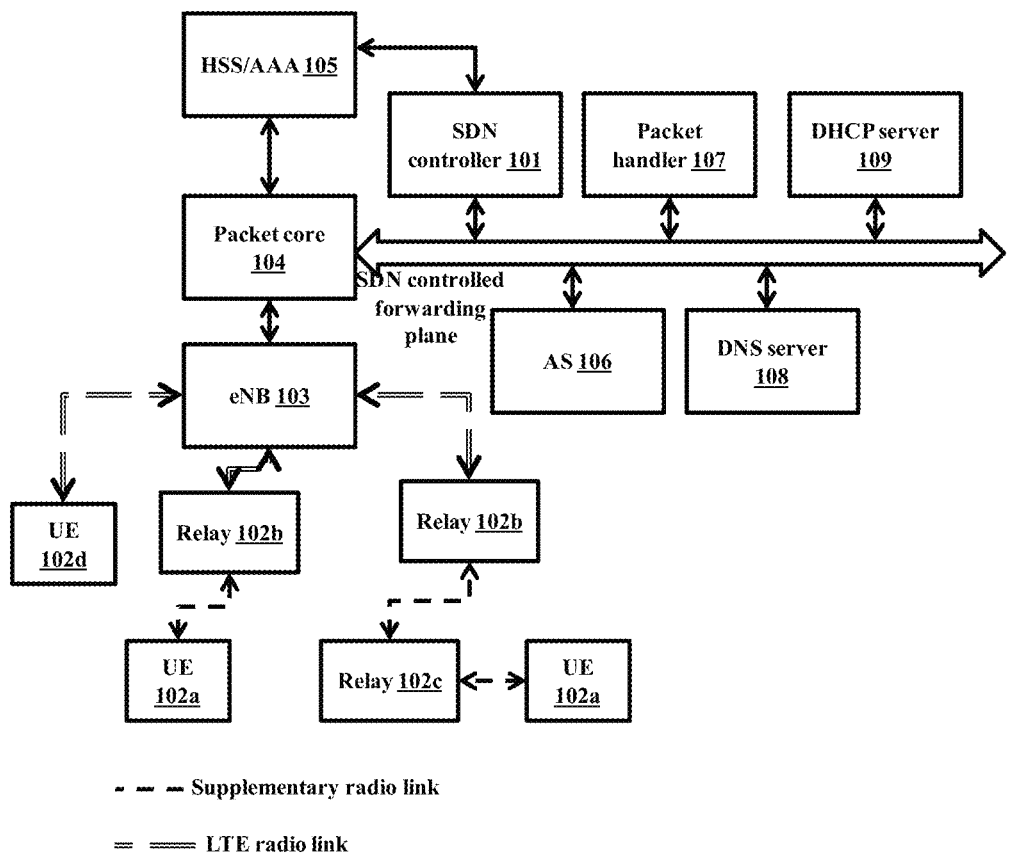
FIG. 1 depicts a network that comprises of a wireless communication network comprising of a SDN controller, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein enhance relay functionality in wireless based communication networks using overlay networks, wherein the overlay network is controlled and managed by a SDN (Software Defined Networking) controller. Referring now to the drawings, and more particularly to FIGS. 1 through 5, where similar reference characters denote corresponding features consistently throughout the figures, there are shown embodiments.

Embodiments herein create an overlay network on top of a wireless network infrastructure (hereinafter referred to as a primary wireless network), which comprises of devices (such as UEs (User Equipments), relays, and so on) which need not be connected to the primary wireless network and other network nodes such as an Application Server to support Mission Critical Communication Services, (for example, Push-to-talk (MCPTT) or Mission Critical Video). Embodiments herein can use a primary wireless network for infrastructure mode communication; for example, a Long Term Evolution (LTE) based communication network. Embodiments herein additionally use a supplementary radio network to support Device-to-Device/Device-to-Relay communication over a wireless communication means (such as a Wireless Local Area Network (IEEE 802.11 Wi-Fi) or Personal Area Network (for example, Bluetooth)) and enhance the wireless coverage area. Embodiments herein support Multi-hop communication over the supplementary radio network. Embodiments herein use the SDN controller for control and management of the overlay network including the Supplementary Radio Network. The SDN controller can be used to authenticate the devices and enabling secure communication between the devices over the supplementary radio link. The SDN controller can select an optimal path for data transfer between the nodes, wherein the data path can be selected based on factors such as avoiding unnecessary battery drainage for devices with low energy reserves. The SDN controller can reduce interference in the Supplementary Radio Network and thereby increase the throughput of the network.

FIG. 1 depicts a network that comprises of a primary wireless network and the overlay network managed by a SDN controller. The network 100, as depicted, comprises of a SDN controller 101, a plurality of user devices 102 (which can function as at least one of a UE 102a, 102d and/or a relay 102b, 102c, 102e), at least one eNB (eNodeB) 103, a packet core 104, and a HSS/AAA (Home Subscriber Server/Authentication, Authorization, and Accounting) module 105. The network 100 can further comprise of additional modules such as an AS (Application Server) 106, a packet handler 107, a DNS (Domain Name System) server 108, and a DHCP (Dynamic Host Configuration Protocol) server 109.

Figure 2A:
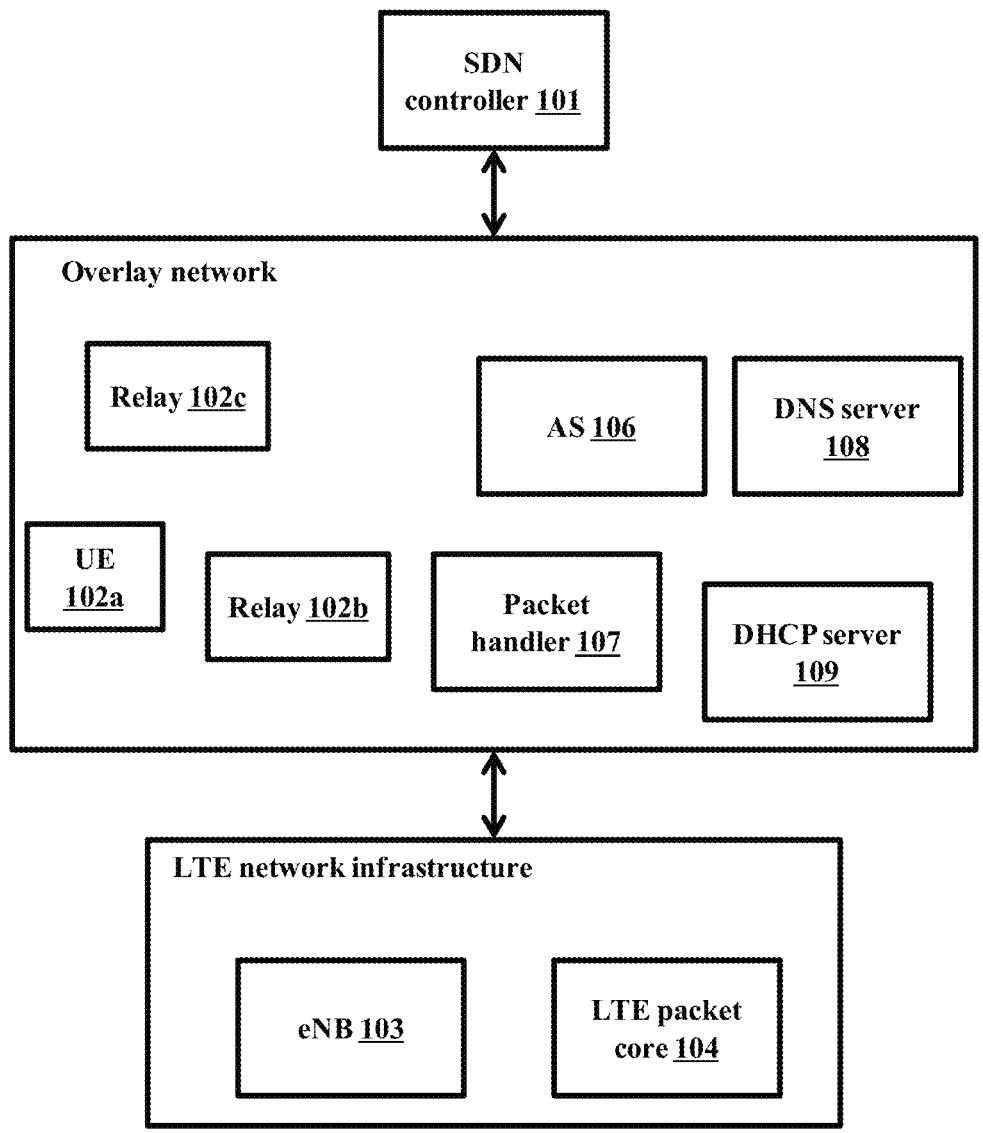
FIG. 2a depicts the overlay network, according to embodiments as disclosed herein.
Figure 2B:
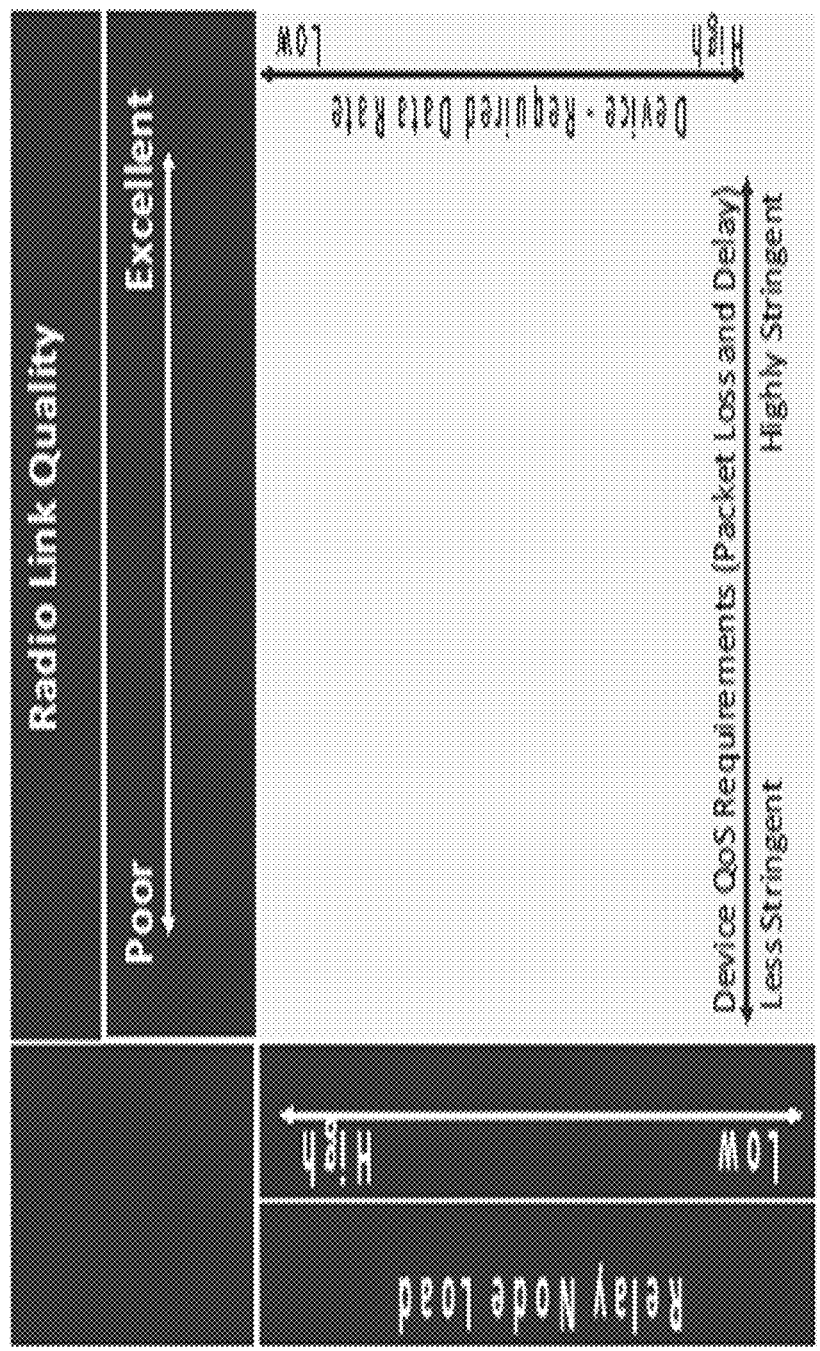
FIG. 2b depicts a scheme for selecting an optimal data path for a device, according to embodiments as disclosed herein.

The overlay network on top of the primary wireless network can comprise of devices 102, and network nodes such as the Application Server (AS) 106, the packet handler 107, the DNS server 108, and the DHCP server 109 (as depicted in FIG. 2a). The SDN controller 101, the AS 106, the packet handler 107, the DNS server 108, and the DHCP server 109 can be connected to each other and to the packet core 104 using a SDN controlled forwarding plane. The AS 106 supports mission critical applications, such as push-to-talk, mission critical video/data and so on. The packet handler 107 supports encapsulation and de-capsulation of packets, as described in further details in Indian patent 201721017967. Additionally, the DHCP server 109 performs address allocation to UEs and the DNS server 108 performs domain name resolution. The overlay network can be created on top of the network, without any changes in the wireless network architecture or functionality.

The SDN Controller 101 can manage the overlay network, and can guide the flow of data through it. The SDN Controller 101 can also authenticate the devices 102, which are a part of the overlay network (without any direct connectivity to the primary wireless network) using the HSS/AAA 105. On authenticating the devices 102, the SDN Controller 101 can enable secure communication between the devices over the supplementary radio link. The SDN Controller 101 can also assist in addressing issues associated with the adhoc networks, such as avoiding unnecessary battery drainage for devices with low energy reserve, and so on. The SDN controller 101 can configure the data path to enable the flow of packets through the appropriate network modules, such as the packet handler 107, the DNS 108, the DHCP Server 109, and so on.

The SDN controller 101 can also designate a subset of devices 102 as relays 102b, 102c. For example, if Wi-Fi is used for the supplementary radio technology, the relays 102b, 102c act as Wi-Fi Access Points in addition to possibly acting as a UE. Such devices enable the integration of the supplementary radio network with the primary wireless network.

Devices 102, which are in the vicinity of the eNodeB 103, try to connect to the wireless network after they come up. Once a particular device, having the capability to act both as a UE 102a, 102d and a Relay 102b, 102c (e.g., capable of acting as a Wi-Fi Access Point for Wi-Fi network) is connected to the primary wireless network, it can act as a potential relay node. The SDN controller 101 decides on whether a particular device is to function as a relay 102c. Once a device 102 starts acting as a relay 102b/102c, other devices 102 (can be UEs 102a or other relays 102b, 102c) which are unable to directly connect to the primary wireless network and are in the neighborhood of this relay 102b, 102c, try to establish association with the relay 102b, 102c on the Supplementary (e.g., Wi-Fi) radio link. Consider that UE 102a is unable to connect to the primary wireless network directly. The UE 102a and the relay 102b, 102c can be connected to each other by a supplementary radio link, wherein the SDN controller 101 controls the supplementary radio link. The UE 102a can use the supplementary radio interface to send packets to the eNB 103 via the relays 102b, 102c. In an embodiment herein, the UEs 102a and the relays 102b, 102c can be connected to the eNB 103 using the supplementary radio link or any suitable means.

If the relay 102b, 102c is directly connected to the wireless Network as a User Equipment (UE), the communication between the relay 102b, 102c and the SDN controller 101 can use a data bearer created through the wireless network for this UE. The relay 102b, 102c can be connected to the wireless network through another relay 102b, 102c to form a tree-like network structure In FIG. 1, the relay 102b that is directly connected to the eNB 103 is hereinafter referred to as a level 1 relay 102b. Relay 102c which is at a lower level and connected to the level 1 relay 102b, are referred to hereinafter as level 2 relays 102c. Similarly, other levels of relays can exist, based on the number of links required to communicate with the eNB 103 (not depicted in the figures). The relays at the lower levels of the tree like relay network can connect to eNodeB through one or more higher level relays.

If a potential relay 102c is not directly connected to the wireless network as a UE, but is connected via another higher level relay 102b using the supplementary radio interface, then the communication between the potential relay 102c and the SDN controller 101 happens through the higher level relay 102b. These potential relays 102c can be authenticated by the SDN controller 101 using the procedures used over the supplementary radio network, once they connect to the SDN controller 101 via the higher level relay 102b.

The devices, which are directly connected to the primary wireless network, can be a part of the SDN controlled overlay network also and may utilize its direct connectivity to the primary wireless network as a relay link to communicate with other entities in the overlay network. The selection of the direct link to the primary wireless network as the relay link for the overlay communication in this case would follow the same logic of relay selection as illustrated in other paragraphs.

The SDN controller 101 can decide which of the devices 102 are to act as relays 102b, 102c based on criteria such as the data transfer capability of the device over the air interface, location of the device, battery life of the device, path loss as experienced by the device 102 towards the eNodeB 103 (or the next higher level relay 102b) to which it is connected, and so on.

The devices 102 can provide information about their current location to the SDN controller 101. The SDN controller 101 can use the received positions of the devices 102 to determine whether the device should act as a relay 102b, 102c. The current location of the device 102 can be shared with the SDN controller 101 on at least one of periodic intervals or at least one pre-defined event occurring (such as eNB handover, location changing beyond a pre-defined threshold, and so on).

The devices 102 can provide information about their current battery levels and usage to the SDN controller 101. This information can comprise of the current battery levels, the rate of battery usage, and so on. The SDN controller 101 can use the received information of the devices 102 to determine whether the device should act as a relay 102b, 102c. The current battery information of the device 102 can be shared with the SDN controller 101 on at least one of periodic intervals or at least one pre-defined event occurring (such as battery dropping beyond pre-defined threshold, battery consumption increasing beyond a pre-defined threshold, and so on).

The current path loss and Signal to Interference & Noise Ratio (SINR) from the eNB 103 or the next higher level relay 102b, 102c to which it is connected can be shared by the device 102 with the SDN controller 101 on at least one of periodic intervals or at least one pre-defined event occurring (such as path loss increasing beyond a pre-defined threshold, path loss decreasing below a pre-defined threshold, and so on).

Based on periodic updates/events received from the relays/devices and other modules (such as location, battery information, SINR and so on), the SDN controller 101 can redesignate existing relays or designate new relays and also accordingly handover devices between relays. Redesignating existing relays can comprise of stopping designation of the device as a relay and assigning devices connected to the redesignated relay to other relays/eNBs.

Every device 102, once it comes up, checks if it is able to detect an eNB or a relay 102b, 102c (by listening to the broadcast signals) and tries to connect/associate to one of the eNBs/relays. The SDN controller 101 can select a relay for a particular device 102 (to which it gets associated), as per the scheme depicted in FIG. 2b. The scheme helps in selecting the optimal path for data transfer as the SDN controller 101 selects the relays 102b, 102c keeping the data transfer requirement of the mobile device in consideration.

Once a device is selected by the SDN controller 101 to act as a relay 102b, 102c, the SDN controller 101 can provide appropriate radio configuration (such as Wi-Fi channel number, transmit power, and so on, in case of Wi-Fi) to the device, so that the device 102 can start acting as the relay 102b, 102c and transmit relevant pilot signals and allow other devices to associate themselves with it.

The relays can share radio measurements with the SDN controller 101 on at least one of periodic intervals, or on pre-defined events occurring. This enables the SDN controller 101 to take steps for interference management in the supplementary radio network/links.

The SDN controller 101 controls the association of the UE 102a with an appropriate relay 102b, 102c. The SDN controller 101 can try to distribute the load across different relays in proportion to their data transfer capability. The SDN controller 101 can also associate a UE 102a with a relay 102b, 102c towards which the UE 102a is experiencing better channel quality (based on parameters such as a higher SINR (Signal to Interference Noise Ratio)). The SDN controller 101 can also consider the required QoS characteristics of the data flow.

The SDN controller 101 further authenticates the UE 102a and sends a response to the relay 102b, 102c. If the response is that the UE 102a has been successfully authenticated, the UE 102a gets associated with the relay 102b, 102c. The SDN controller 101 can authenticate the UEs 102a that are a part of the overlay network, using the HSS/AAA 105. UEs 102a connected through the relays 102b, 102c can be authenticated via the procedures used over the Supplementary Radio Network (for example, devices connected over Wi-Fi radio link can be authenticated by the SDN controller 101 using IEEE 802.11x/EAP protocols).

Figure 3:
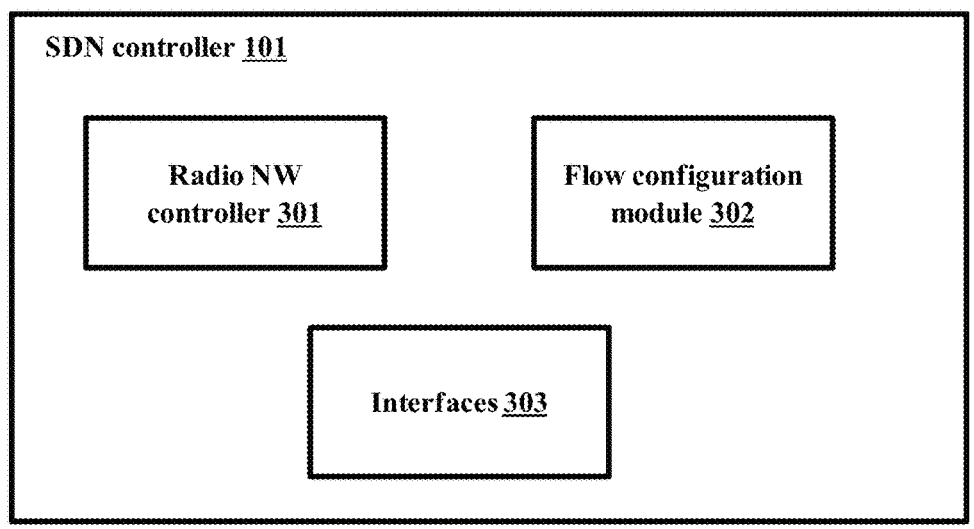
FIG. 3 depicts the SDN controller, according to embodiments as disclosed herein.

FIG. 3 depicts the SDN controller. The SDN controller 101, as depicted comprises of a radio NW (network) controller 301, a flow configuration module 302, and at least one interface 303. The flow configuration module 302 can maintain and set up the data flow paths. The interface 303 can enable the SDN controller 101 to communicate with other modules in the network 100, such as the relays 102b, 102c, UEs 102a, eNBs 103, the packet core 104, the HSSS/AAA 105, the AS 106, the packet handler 107, the DNS server 108, the DHCP server 109, and so on.

The radio NW controller 301 can decide which of the devices 102 are to act as relays 102b, 102c based on criteria such as the data transfer capability of the device over the air interface, location of the device, battery life of the device, path loss as experienced by the device 102 towards the eNodeB 103 (or the next higher level relay 102b) to which it is connected, and so on.

The radio NW controller 301 can select a device 102 capable of transferring data at a higher rate over a device with lower data transfer rate capability as the relay 102b, 102c. For example, for a higher level relay 102b, the radio NW controller 301 can prefer an LTE UE category 3 device over an UE Category 1 device (based on 3GPP Spec TS 36.306) to act as the relay 102b. Similarly, for other level relays (level 2, 3, . . . , N and so on), the radio NW controller 301 can use the data transfer capability of the devices over the Supplementary Radio Link to determine if the device 102 should act as the relay.

The radio NW controller 301 can receive information about the current location of the devices 102, via the interfaces 303. The radio NW controller 301 can use the received positions of the devices 102 to determine whether the device should act as a relay 102b, 102c, wherein this can depend on factors such as relative position of the devices 102 to other components in the network, such as other devices, existing relays, eNB 103, and so on. Based on updated information received from the devices 102 about the location, the radio NW controller 301 can change the status of a device from being a relay 102b, 102c to a UE 102a and vice versa.

The radio NW controller 301 can receive information about the current battery levels and usage of the devices 102, via the interfaces 303. This information can comprise of the current battery levels, the rate of battery usage, and so on. The radio NW controller 301 can use the battery information of the devices 102 to determine whether the device should act as a relay 102b, 102c. In an embodiment herein, the radio NW controller 301 can select a device which has a higher battery life (based on the current battery levels, the rate of battery usage, and so on) as the relay 102b, 102c. Based on updated information received from the devices 102 about the battery levels and the usage, the radio NW controller 301 can change the status of a device from being a relay 102b, 102c to a UE 102a and vice versa.

When the battery goes down lower than a configurable threshold, the radio NW controller 301 can change the status of the relay 102b, 102c to a normal device and the device ceases to be a relay 102b, 102c thereafter; it ensures that there is no further drainage of battery for such devices. Embodiments herein allow for selection of only those devices as relays 102b, 102c, which have sufficient battery life at any point of time.

The radio NW controller 301 can select a particular device 102 to act as the relay 102b, 102b based on the device's path loss from the eNB 103 or the next higher level relay 102b, 102c to which it is connected. For example, the radio NW controller 301 may not consider a device, which is located close to the eNB 103 (for example, in the cell center of a wireless communication network cell) and therefore experiencing very low path loss towards the eNB 103 as an appropriate device to act as the relay itself. This is because most of the other devices in the vicinity of such a device would be able to connect to the eNB directly and may not require the services of a next level (lower level) relay. Similarly, the radio NW controller 301 may not consider a device located far away from an eNB 103 (e.g., in the cell edge of a cell) and experiencing very high path loss towards the eNB 103 as an appropriate device to play the role of the relay. Due to high path loss experienced by such a device, the device may not be able to exchange data with the eNB 103 at high speed and hence may not be able to act as a relay for other devices. Therefore devices that are neither in the cell center nor in the cell edge, but in between can be considered as more appropriate candidates to play the role of the relay. The radio NW controller 301 can receive information about the current path loss from the eNB 103 or the next higher level relay 102b, 102c to which it is connected. Based on the received information, the radio NW controller 301 can change the status of a device from being a relay 102b, 102c to a UE 102a and vice versa.

Once a device is selected by the radio NW controller 301 to act as a relay 102b, 102c, the radio NW controller 301 can provide appropriate radio configuration (such as Wi-Fi channel number, transmit power, and so on, in case of Wi-Fi) to the device, so that the device 102 can start acting as the relay 102b, 102c and transmit relevant pilot signals and allow other devices to associate themselves with it. This enables the NW controller 301 to minimize the interference in the network.

The radio NW controller 301 can authenticate the devices, using the HSS/AAA 105. The radio NW controller 301 can authenticate UEs connected via the relays using procedures used over the supplementary radio network. In an example, if the supplementary radio network is based on Wi-Fi, the radio network controller can authenticate UEs 102a using the IEEE 802.11x/EAP protocols.

The radio NW controller 301 controls the association of the UE 102a with an appropriate relay 102b, 102c. For example, in case of usage of Wi-Fi for the supplementary radio link, the UE 102a sends a IEEE 802.11 Association Request to nearby relays 102b, 102c. The relays 102b, 102c forwards the request to the radio NW controller 301, via the interfaces 303. On receiving the request, the radio NW controller 301 checks parameters such as the load and the data transfer capability of the relay, load distribution across different relays 102b, 102c in proportion to their data transfer capability, channel conditions as experienced by the UE on different radio links to the relays 102b, 102c, required QoS (Quality of Service) characteristics of the intended data transfer (such as what are the required QoS characteristics of the data flow, for example, required data rate, packet delay budget, acceptable Packet Loss Rate and which link will help it (the data flow) meet the QoS characteristics better), and so on. For example, for a UE with stringent QoS requirements (such as low acceptable packet rate and low delay budget), a link with higher SINR can be used. The radio NW controller 301 can try to distribute the load across different relays in proportion to their data transfer capability. Load computation of the relay 102b, 102c takes both the actual traffic and its max data transfer capability at that moment into account. For example, out of two relays with the same % traffic loading (say 50% load), a node with higher max data transfer capability at that moment is considered less loaded. The max data transfer capability of the relay 102*b*, 102*c* at a particular moment is dependent on the capability of the node and the SINR experienced by it at that moment. The radio NW controller 301 can also associate a UE 102*a* with a relay 102*b*, 102*c* towards which the UE 102*a* is experiencing better channel quality (based on parameters such as a higher SINR (Signal to Interference Noise Ratio)). The radio NW controller 301 further authenticates the UE 102*a* and sends a response to the relay 102*b*, 102*c*.

In a scenario where there is a single relay in the vicinity of a mobile device, the radio NW controller 301 has to select the lone relay as the next hop for the device. In such a scenario, another device already associated with this relay may be handed over to another relay to reduce the load on the relay, if required.

The radio NW controller 301 can also take care of operations such as handover of a UE from one relay to another or relay to the wireless network, and so on.

Once a relay 102*b*, 102*c* is re-designated as a UE 102*a*, it indicates this to all associated devices so that these associated devices can disassociate themselves from this relay 102*b*, 102*c* and associate to some other relay 102*b*, 102*c* in their vicinity.

The radio NW controller 301 can receive radio measurements from the relays 102*b*, 102*c* on at least one of periodic intervals, or on pre-defined events occurring. This enables the Radio NW controller 301 to take steps for interference management in the supplementary radio network/links. The radio NW controller 301 can try to reduce the interference in the supplementary radio network by performing actions such as controlling the transmit power of the relays 102*b*, 102 and UEs 102*b*, allocating different wireless channels to neighbouring relays for transmission and reception of signals, ensuring that the relays 102*b*, 102*c* are not in close vicinity of each other, and so on.

The radio NW controller 301 can configure the data flow via the packet handler 107 and can send packets to appropriate network functions through the overlay network.

Figure 4:
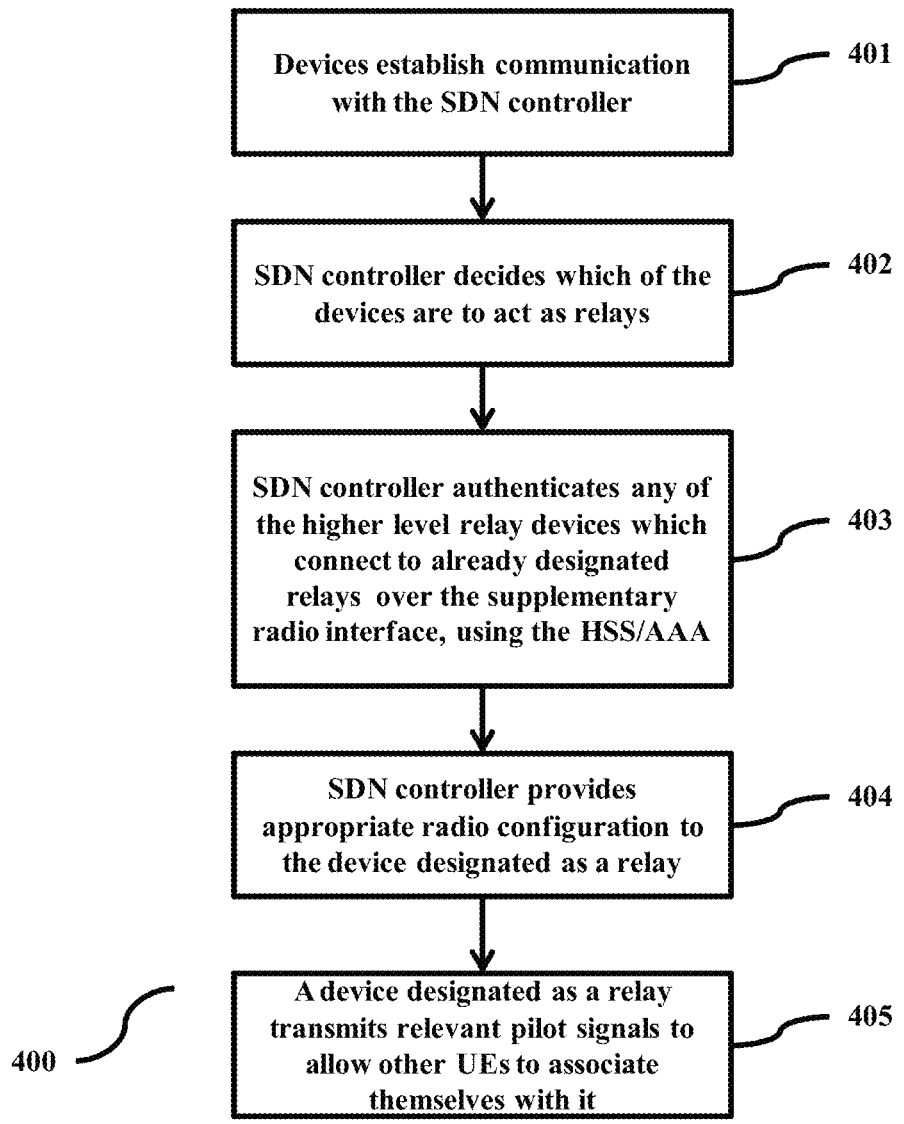
FIG. 4 depicts the management of the overlay network by the SDN controller, according to embodiments as disclosed herein.

FIG. 4 depicts the management of the overlay network by the SDN controller. The devices 102, which are directly connected to the primary wireless network, establish (401) communication with the SDN controller 101. If the device 102 is directly connected to the wireless Network as a User Equipment (UE), the communication between the device 102 and the SDN controller 101 can use a data bearer created through the primary wireless communication network for this UE. If the device 102 is not directly connected to the primary wireless network as a UE, but is connected via another higher level relay 102*b*, then the communication between the device 102 and the SDN controller 101 happens through the higher level relay 102*b*. The SDN controller 101 decides (402) which of the devices 102 are to act as relays 102*b*, 102*c*. Once connected, every device shares parameters with the SDN controller 101, such as total data transfer capability of the device over radio interface, location of the device, battery life of the device, path loss& Signal to Interference & Noise ratio (SINR) as experienced by the device towards the next higher level Node (which can be a relay or an eNB) to which it is connected/associated, and so on. Except for the total data transfer capability, all other parameters can be shared periodically as well, i.e., on regular intervals with the SDN controller 101. The SDN controller 101 may designate a device as a relay based on criteria such as capability of being able to transfer data at a rate higher than a configurable threshold value, the battery life being higher than a configurable threshold value, the value of it's path loss towards the next higher level relay/ eNB being within a configurable range, absence of relays/eNBs in the vicinity (which can be configurable range) of the device, and so on. Typically, the SDN controller 101 can select a device, which falls neither in the cell center nor in the cell edge regions, but in between, as the relay 102*b*, 102*c*. The SDN controller 101 further authenticates (403) the higher level relay devices which connect to already designated relays over the supplementary radio interface, using the HSS/AAA 105. Once a device is selected by the SDN controller 101 to act as a relay 102*b*, 102*c* and successfully authenticated, the SDN controller 101 provides (404) appropriate radio configuration (such as Wi-Fi channel number, transmit power, and so on, in case of Wi-Fi) to the device designated as a relay, so that the device 102 transmits (405) relevant pilot signals and allow other devices to associate themselves with it. The various actions in method 400 may be performed in the order presented, in a different order or simultaneously. Further, in some embodiments, some actions listed in FIG. 4 may be omitted.

Figure 5:
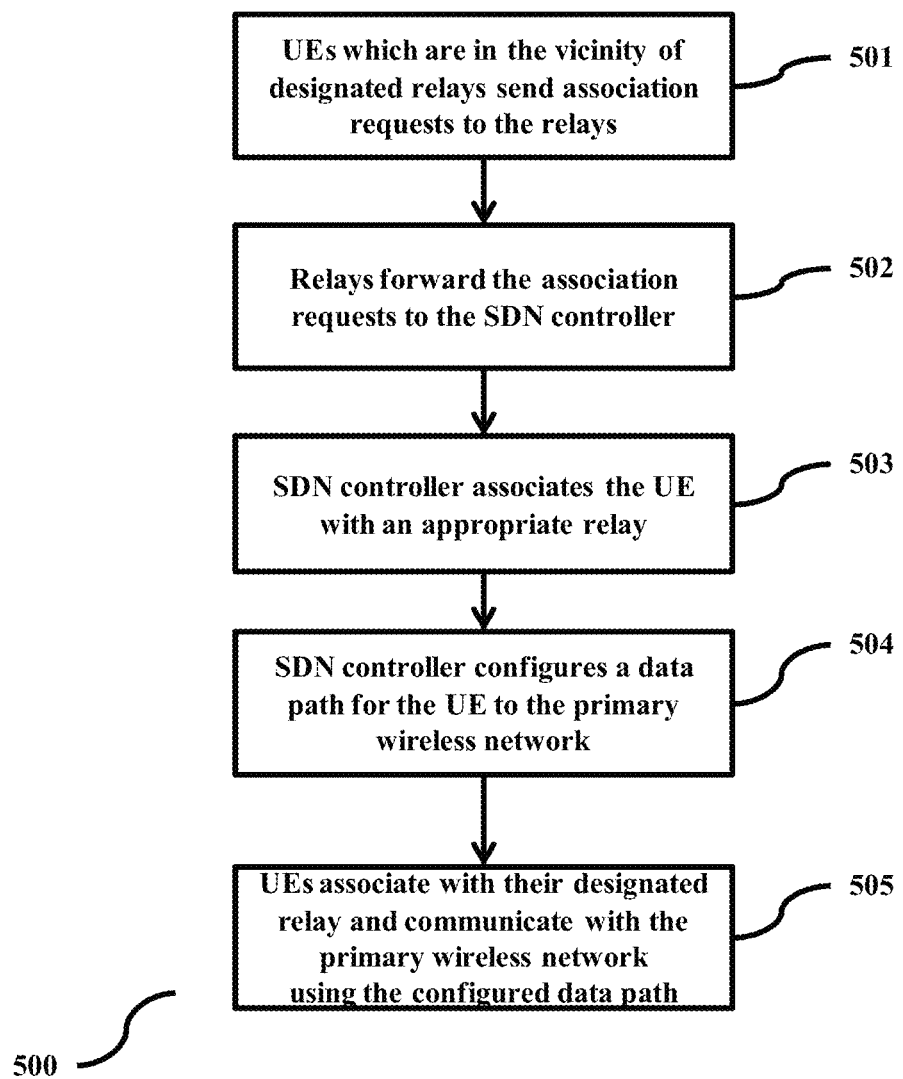
FIG. 5 depicts the process of associating UEs with relays, according to embodiments as disclosed herein.

FIG. 5 depicts the process of associating UEs with relays. The UEs 102*a*, which are in the vicinity of designated relays 102*b*, 102*c*, sends (501) association requests to the relays 102*b*, 102*c*. The relays 102*b*, 102*c* forwards (502) the association requests to the SDN controller 101. On receiving the request, the SDN controller 101 associates (503) the UE 102*a* with an appropriate relay 102*b*, 102*c* and configures (504) a data path for the UE 102*a* to the primary wireless network. On receiving the information from the SDN controller 101, the UEs associate (505) with their designated relay and communicate using the configured data path. The various actions in method 500 may be performed in the order presented, in a different order or simultaneously. Further, in some embodiments, some actions listed in FIG. 5 may be omitted.

The embodiments disclosed herein can be implemented through at least one software program running on at least one hardware device and performing network management functions to control the network elements. The network elements shown in FIGS. 1 and 2 include blocks, which can be at least one of a hardware device, or a combination of hardware device and software module.

The embodiment disclosed herein enhance relay functionality in wireless communication networks using overlay networks, wherein the overlay network is controlled and managed by a SDN (Software Defined Networking) controller. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

We claim:

1. An apparatus (101) for managing an overlay network in a multi-Radio Access Technology (RAT) wireless network, the apparatus (101) comprising:
   a network controller (301);
   a flow configuration module (302); and
   at least one interface (303), wherein the at least one interface (303) couples the network controller (301) and the flow configuration module (302) to the overlay network, wherein the overlay network comprises an AS (Application Server) (106), a packet handler (107), a DNS (Domain Name System) server (108), and a DHCP (Dynamic Host Configuration Protocol) server (109), wherein the network controller (301) is configured to:
      select at least one device (102) in the multi-RAT wireless network as a relay (102b, 102c) based on at least one radio measurement, wherein the at least one radio measurement comprises at least one or more of data transfer capability of the at least one device (102) over an air interface, location of the at least one device (102), battery life of the at least one device (102), path loss as experienced by the at least one device (102) towards at least one of a eNodeB (103) or another relay (102b) to which the at least one device (102) is connected, wherein the network controller (301) is configured to change a status of the relay (102b, 102c) to a UE (102a), when the battery life of the at least one device (102) is lower than a configurable threshold;
      provide appropriate radio configuration to the relay (102b, 102c), on selecting the at least one device (102) as a relay (102b, 102c);
      controlling association of at least one UE (User Equipment) (102a) with the relay (102b, 102c) based on at least one of channel quality, QoS (Quality of Service) characteristics of data flow to and from the UE (102a), available optimal path between the UE (102a) and the relay (102b, 102c), and load and transfer capability of the relay (102b, 102c);
      perform interference management in a supplementary radio link based on sharing of the at least one radio measurement with the network controller (301), wherein the sharing is performed by the at least one device (102) on at least one or more of periodic intervals and on pre-defined events occurring; and
      enable communication over the supplementary radio link between the at least one UE (102a) and the relay (102b, 102c).

2. The apparatus, as claimed in claim 1, wherein the network controller (301) is further configured to authenticate the at least one device (102) using the HSS/AAA (Home Subscriber Server/Authentication, Authorization, and Accounting) module 105, before selecting the at least one device (102) in the wireless network as the relay (102b, 102c), wherein the at least one device (102) is not directly connected to a cellular wireless network.

3. The apparatus, as claimed in claim 1, wherein the network controller (301) is further configured to authenticate the at least one UE (102a) using the HSS/AAA (Home Subscriber Server/Authentication, Authorization, and Accounting) module 105, before associating the at least one User Equipment (102a) with the relay (102b, 102c), wherein the at least one User Equipment (102a) is not directly connected to the cellular wireless network.

4. The apparatus, as claimed in claim 1, wherein the the network controller (301) is further configured to perform load distribution in proportion across different relays, when associating the at least one User Equipment (102a) with the relay (102b, 102c).

5. The apparatus, as claimed in claim 1, wherein the network controller (301) is further configured to redesignating relays, based on information received by the network controller (301), wherein the information comprises location of the at least one device (102), battery information of the at least one device (102), and Signal to interference and noise ratio (SINR).

6. The apparatus, as claimed in claim 1, wherein the network controller (301) is further configured to perform handover for the at least one UE (102a).

7. A method for managing an overlay network in a wireless network, the method comprising:
   selecting, by a network controller (301), at least one device (102) in the wireless network as a relay (102b, 102c) by a SDN (Software Defined Networking) controller (101) based on at least one radio measurement, wherein the at least one radio measurement comprises at least one or more of data transfer capability of the device (102) over an air interface, location of the at least one device (102), battery life of the at least one device (102), path loss as experienced by the at least one device (102) towards at least one of a eNodeB (103) or another relay (102b) to which the at least one device (102) is connected, wherein changing, by the network controller (301), a status of the relay (102b, 102c) to a UE (102a), when the battery life of the at least one device (102) is lower than a configurable threshold;
   providing, by the network controller (301), radio configuration to the relay (102b, 102c) by the SDN controller (101), on selecting the at least one device (102) as a relay (102b, 102c);
   controlling, by the network controller (301), an association of at least one UE (User Equipment) (102a) with the relay (102b, 102c) by the SDN controller (101) based on at least one of channel quality, QoS (Quality of Service) characteristics of data flow to and from the UE (102a), available optimal path between the UE (102a) and the relay (102b, 102c), and load and transfer capability of the relay (102b, 102c);
   performing, by the network controller, interference management in a supplementary radio link based on sharing of the at least one radio measurement with the network controller (301), wherein the sharing is performed by the at least one device (102) on at least one or more of periodic intervals and on pre-defined events occurring; and enabling, by the network controller (301), communication over the supplementary radio link between the at least one UE (102*a*) and the relay (102*b*, 102*c*).

8. The method as claimed in claim 7, wherein the method further comprises authenticating the at least one device (102) by the network controller (301) using the HSS/AAA (Home Subscriber Server/Authentication, Authorization, and Accounting) module 105, before selecting the at least one device (102) in the wireless network as the relay (102*b*, 102*c*), wherein the at least one device (102) is not directly connected to a cellular wireless network.

9. The method as claimed in claim 7, wherein the method further comprises authenticating the at least one UE (102*a*) by the network controller (301) using the HSS/AAA (Home Subscriber Server/Authentication, Authorization, and Accounting) module 105, before associating the at least one User Equipment (102*a*) with the relay (102*b*, 102*c*), wherein the at least one User Equipment (102*a*) is not directly connected to a cellular wireless network.

10. The method, as claimed in claim 7, wherein the method further comprises performing load distribution by the network controller (301) in proportion across different relays, when associating the at least one User Equipment (102*a*) with the relay (102*b*, 102*c*).

11. The method, as claimed in claim 7, wherein the method further comprises redesignating relays by the network controller (301), based on information received by the network controller (301), wherein the information comprises location of the at least one device (102), battery information of the at least one device (102), and Signal to Interference and Noise Ratio (SINR).

12. The method, as claimed in claim 7, wherein the method further comprises performing handover for the at least one UE (102*a*) by the network controller (301).

\* \* \* \* \*